United States Patent
Chow (10) Patent No.: US 7,684,053 B2
(45) Date of Patent: Mar. 23, 2010

(54) OPTICAL DISPLACEMENT SENSOR AND DISTANCE MEASURING APPARATUS

(75) Inventor: Yeung Ming Chow, Hong Kong (CN)

(73) Assignee: Hong Kong Applied Science and Technology Research Institute Co., Ltd., Hong Kong (CN)

(*) Notice: Subject to any disclaimer, the term of this patent is extended or adjusted under 35 U.S.C. 154(b) by 327 days.

(21) Appl. No.: 11/637,008

(22) Filed: Dec. 12, 2006

(65) Prior Publication Data

US 2008/0137071 A1 Jun. 12, 2008

(51) Int. Cl.
*G01B 11/24* (2006.01)
(52) U.S. Cl. .................. 356/602; 356/623; 356/608
(58) Field of Classification Search .......... 356/601–623
See application file for complete search history.

(56) References Cited

U.S. PATENT DOCUMENTS

| | | | | |
|---|---|---|---|---|
| 4,622,462 A | * | 11/1986 | Eaton et al. | 250/236 |
| 4,639,140 A | * | 1/1987 | Lerat | 356/609 |
| 5,512,997 A | * | 4/1996 | Ogawa | 356/3.04 |
| 5,613,167 A | * | 3/1997 | Suzuki | 396/106 |
| 5,659,396 A | * | 8/1997 | Mondie | 356/630 |
| 5,694,220 A | * | 12/1997 | Ooki et al. | 356/601 |
| 5,754,281 A | * | 5/1998 | Maeda | 356/3.08 |
| 5,798,836 A | * | 8/1998 | Shimokawa | 356/614 |
| 5,812,269 A | * | 9/1998 | Svetkoff et al. | 356/602 |
| 5,870,199 A | * | 2/1999 | Wurbs et al. | 356/613 |
| 6,222,628 B1 | * | 4/2001 | Corallo et al. | 356/601 |
| 6,624,899 B1 | | 9/2003 | Clark | |
| 6,879,407 B2 | | 4/2005 | Inoue et al. | |
| 7,312,879 B2 | * | 12/2007 | Johnston | 356/614 |

OTHER PUBLICATIONS

Acuity Laser Measurement, Laser displacement sensors - AccuRange 600, Technical Info: Digital distance meters for heavy industry applications, 2009, 2 pps.

* cited by examiner

*Primary Examiner*—Hoa Q Pham
(74) *Attorney, Agent, or Firm*—Buchanan Ingersoll & Rooney PC (57) ABSTRACT

An optical displacement sensor for measuring distance or surface displacement of an object by surface profile scanning includes an optical source, a first optical detector and a second optical detector. The optical source is located intermediate the first and second optical detectors. The first and second optical detectors are arranged to collect light emitted by the optical source when scattered by and/or reflected from the object.

29 Claims, 11 Drawing Sheets

OPTICAL DISPLACEMENT SENSOR AND DISTANCE MEASURING APPARATUS

FIELD OF THE INVENTION

The present invention relates to optical displacement sensors, and more particularly, to optical displacement sensors for determining the surface profile of an object. This invention also relates to distance measuring apparatus comprising an optical displacement sensor.

BACKGROUND OF THE INVENTION

Figure 1:
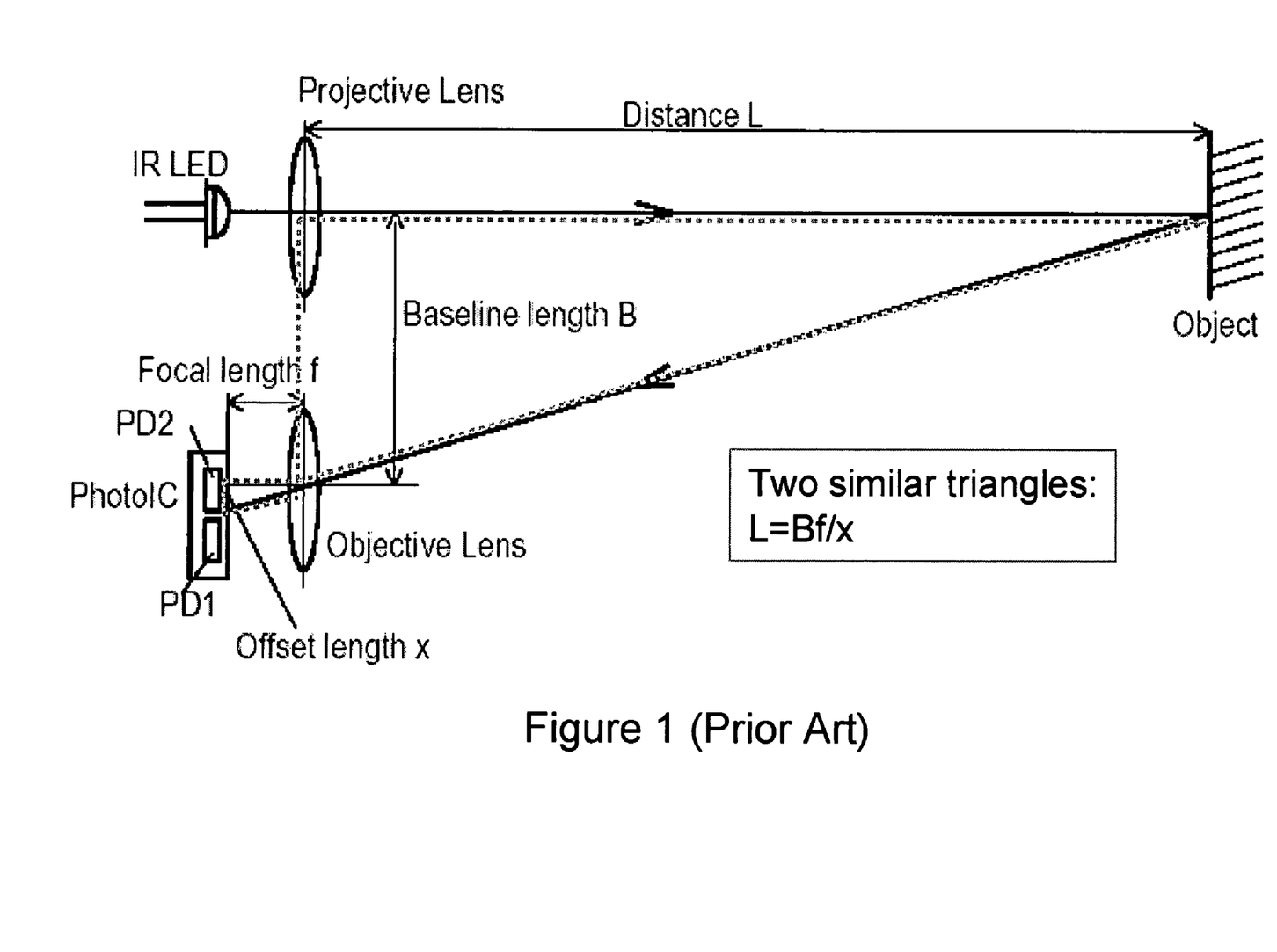
FIG. 1 is a schematic diagram illustrating an exemplary distance measurement scheme using the triangulation principle.

Optical displacement sensors are widely used in distance or displacement measurements. An exemplary distance measurement arrangement comprising an optical source, a position sensitive optical detector (PSD) and focus lens is shown in FIG. 1.

In such an optical arrangement, the distance of an object (L) from a reference point can be evaluated from the triangulation principle and is equal to Bf/x, where B is the baseline length between the optical axis of the optical source, which is an LED is the example, and the optical detector; f is the focal length; and x is of off-set distance from the central axis of the receiver lens.

A useful application of such an optical distance arrangement is in surface profiling of an object, for example, for liquid level monitoring, for surface profiling of a circuit or semiconductor assembly, for surface profiling of a mechanical mold, or other surface profile monitoring.

Optical displacement sensors for use in surface profiling or like applications are commonly available in a module form with an optical source and a PSD packaged within a module housing. To facilitate optimal optical performance a focusing lens is provided on the module housing for coupling optical output from the optical source to an external object and another focusing lens is provided on the module housing for collecting optical signals returned from the external object, for example, by reflection or scattering.

Examples of commercially available optical displacement sensor modules include Model AR600 of Acuity, Inc., Model GP2YOD340K of Sharp, Inc., and Model Nos. PZ-V11 and LK-G of Keyence, Inc.

An exemplary application of such optical displacement sensors for distance measurement is described in U.S. Pat. No. 6,879,407. Such an exemplary distance measurement arrangement typically comprises a movement mechanism for causing relative movements between the surface of an object to be scanned and the scanning optical displacement sensor. However, it is noted that such optical displacement sensors will give an erroneous output when an edge is encountered.

Therefore, it will be desirable if there can be provided improved optical displacement sensors and distance/displacement measuring apparatus incorporating same to alleviate shortcomings of conventional devices.

SUMMARY OF THE INVENTION

According to the present invention, there is provided an optical displacement sensor for measuring distance or surface displacement of an object by surface profile scanning comprising an optical source, a first optical detector and a second optical detector, wherein said optical source is located intermediate said first and said second optical detectors, and said first and second optical detectors are arranged to collect light emitted by said optical source when scattered by and/or reflected from said object.

According to another aspect of this invention, there is provided a surface displacement sensor for measuring displacement by scan profiling of the surface of an object, said displacement sensor comprising an optical displacement sensor described herein and a processor, wherein said processor is configured to process outputs of said optical detectors to compile surface profile information of an object.

By having an optical displacement sensor in which the optical source is intermediate a pair of optical detectors so that the light scattered and/or reflected by an object can be collected by the pair of optical detectors, problems associated with a conventional optical displacement sensor can be mitigated.

In a preferred embodiment, said optical source is configured to emit light towards an object the surface profile of which is to be scanned, said first optical detector is forward of said optical source, and said optical detector is rearward of said optical source.

By disposing an optical detector forward of the optical source, and an optical detector rearward of the optical source, blockage or partial blockage of reflected and/or scattered light to be collected by one optical detector due to a step will not affect the collection of light by another optical detector. By comparing light collected from the pair of optical detectors, detection errors due to blocking or partial blocking of light by a step can be identified an duly processed to mitigate errors.

In a preferred embodiment, said first optical detector is arranged to collect light coming from said object along a first direction, and said second optical detector is arranged to collect light coming from said object along a second direction, said first and second directions being divergent from said object. The divergency between the first and second directions means that only a portion of light to be collected by one of the optical detectors will be affected if the first and second directions are at an angle to a step.

Notably, said optical source is configured to emit light along an optical output axis, and said first and second directions are divergent from said optical axis.

In a preferred embodiment, when said first and second detectors are arranged so that when said optical source emits light towards a depressed surface proximal a step, only light reflected or scattered from said depressed surface and to be collected by one of said optical detectors will be blocked or partially blocked by said step. Since only one of the optical detectors will be affected, output from the other detector could be used for processing surface profiling information.

By tracking and comparing outputs from the optical detectors, and since both detectors are arranged to collect light reflected and/or scattered from a common surface, an output from a clean, unaffected, optical detector could be selected for further processing.

In an illustrative example, said optical source is configured to emit light along an optical output axis, said first optical detector is configured to detect light coming along a first optical reception axis, said second optical detector is configured to detect light coming along a second optical reception axis, said optical output axis is intermediate said first and second optical detection axes, said first and second optical detection axes define there-between an optical detection region, and an optical barrier situated within said optical detection region will block or partially block light to be collected by either or both of said optical detectors.

More particularly, said optical detection region defines the minimum transversal resolution detectable by said displacement sensor and said minimum transversal resolution defines the minimum transversal separation between an adjacent pair of steps the displacement between which can be measured by said sensor.

In addition, said minimum transversal separation defines the minimum clearance between an oppositely adjacent pair of steps above which only light to be collected by either one, but not both, of said optical detectors will be blocked or partially blocked by a step.

As depicted in a preferred example, said first optical reception axis and said second optical axes together define an axial cross-sectional outline of a cone, with said first and second optical reception axes and said optical output axis meeting at the vertex of said cone.

More particularly, said cone defines the minimum separation between said optical output axis and the edge of a step below which light to be collected by an optical detector proximal to said step will be blocked or partially blocked.

In a preferred example, each one of said optical detectors comprises a position sensitive photo-detector, and each one of said first and second optical reception axes and said optical output axis defines two long sides of a triangle for determining the vertical displacement of a surface by the triangulation principle with reference to the output of said position sensitive photo-detector.

In an exemplary application, said optical detectors are arranged such that relative movements between said optical source and said object along a scanning direction will output information corresponding to the profile of said surface of said object.

More particularly, said optical source may be configured to emit light along an optical output axis, said first and second optical detectors may be configured to detect light coming along a first optical reception axis and a second optical reception axis respectively. With this configuration, said first optical reception axis and said optical output axis will define a first plane, and said second optical reception axis and said optical output axis will define a second plane. Said sensor is configured so that upon relative movements between said sensor and said object along a scanning direction for measuring the surface profile of an object, said first and said second planes will encounter said step sequentially and output profile information concerning said step at different times.

To utilize the benefit of this sensor, said first and second planes may encounter said step at an angle.

For example, said first and second planes may encounter said step orthogonally.

As a specific example, said optical source may be configured to emit light along an optical output axis, said first and second optical detectors may be configured to detect light coming along a first optical reception axis and a second optical reception axis respectively. With such configuration, said first optical reception axis and said optical output axis define a first plane, said second optical reception axis and said optical output axis define a second plane, and said sensor is configured so that upon relative movements between said sensor and said object along a scanning direction for measuring the surface profile of an object, said first and said second planes will encounter said step orthogonally.

In a packaged example of this sensor, said optical source may be coupled with a collimating lens to output light towards said object along an optical output axis, and each one of said optical detectors may be coupled to a focusing lens for collecting light reflected and/or scattered by said surface being profiled during operation.

For example, said optical detectors may be equidistant from said optical source.

Alternatively or in addition, said optical detectors and said optical source are accommodated within a housing, and said optical detectors and said optical source are optically communicable with said surface being profiled respectively through said focusing lenses and said collimating lens.

Generally, each said optical detector may comprise a position sensitive optical detector, and said position sensitive optical detector is characterised in having an output which is dependent on the position of incidence of an optical signal.

In particular, each said optical detector is arranged to detect the spot location of an incident optical beam.

For example, each said optical detector may comprise at least two photo-diodes.

As a convenient example, said optical source may comprise an LED.

In an exemplary application, said surface profile information is compiled from output of said position sensitive optical detector.

In an arrangement where said position sensitive optical detector comprises at least one pair of photo-detectors, said processor may be configured to process the difference in output between said pair of photo-detectors to compile surface profile information of an object.

In an exemplary arrangement, the surface displacement sensor may comprise a movement mechanism to cause relative movement between said optical displacement sensor and said surface of said object along a direction which is substantially orthogonal to a step, and said processor is configured to select an output from the outputs of said first and second detectors upon encountering said edge.

Advantageously, said first optical detector is forward of said optical source, said optical detector is rearward of said optical source, the output of the leading optical detector which is said first optical detector is selected for processing by said processor to produce displacement information on the step height of said step after said first optical detector has passed said step.

For example, the arrangement may be used for IC surface or other profiling applications.

BRIEF DESCRIPTION OF THE DRAWINGS

Preferred embodiments of the present invention will be explained in further detail below by way of examples and with reference to the accompanying drawings, in which:—

DETAILED DESCRIPTION OF THE PREFERRED EMBODIMENTS

Figure 2:
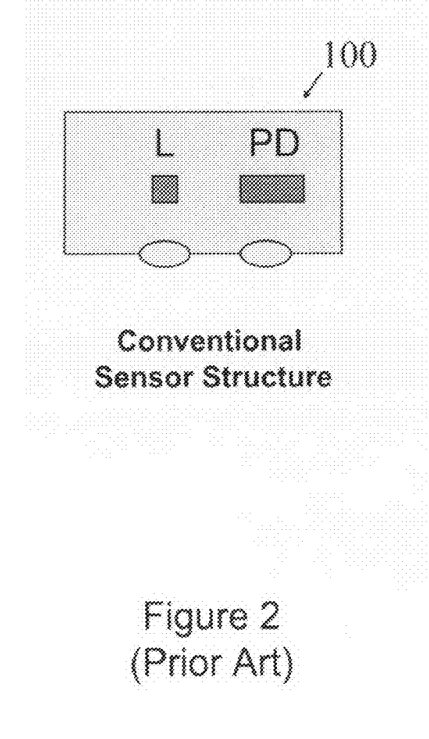
FIG. 2 illustrates in schematics a conventional packaged optical displacement sensor comprising an optical source and a position sensitive photo-detector.

A conventional packaged optical displacement sensor 100 as shown in FIG. 2 comprises an optical source, which is usually an LED source; an optical detector which is usually a position sensitive photo-detector (PSD); a collimating lens for collimating optical output of the optical source towards an object the surface of which is to be profiled; a focusing lens for focusing light to be collected by the PSD; and a housing enclosing the various components. In general, the optical output of the optical source is characterized with an optical output axis and the PSD is characterized with an optical reception axis. Since a PSD is arranged to collect light from the optical source after being reflected and/or scattered by a surface, the optical output axis and the optical reception axis meet at the surface being profiled. Conveniently, the optical output axis and the optical reception axis can be considered as together defining an optical plane characteristic of an optical displacement sensor.

Figure 2A:
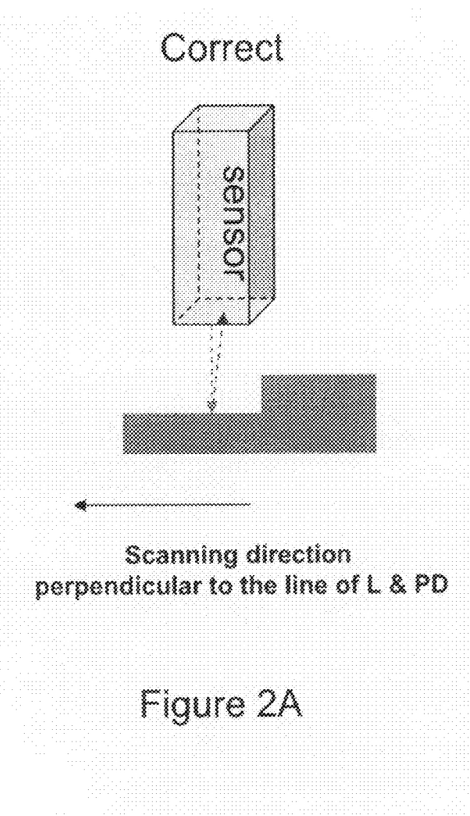
FIG. 2A illustrates the typical use of a conventional packaged displacement sensor of FIG. 2.

When using a conventional optical displacement sensor, the orientation of the sensor must be carefully arranged so that the optical plane is parallel to the edge of a step, as shown in FIG. 2A. Such a limitation or application condition is expressly described in many application notes of commercially available sensors, otherwise detection errors as indicated in FIGS. 2B to 2E will result.

Figure 2B:
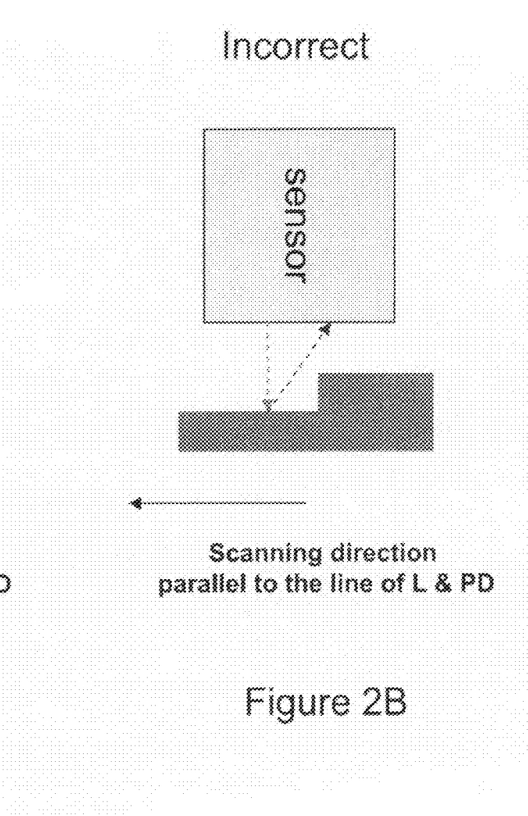
FIG. 2B illustrates an "incorrect" use of a conventional packaged optical displacement wherein an optical plane defined by the optical output axis of the optical source and the optical reception axis of the photo-detector is orthogonal to a step.

FIG. 2B depicts an application of a conventional optical displacement sensor in a distance measurement arrangement in which the optical plane is orthogonal, or at an angle, to a step on a surface to be profiled. As shown in FIG. 2B, an optical beam emitted by the laser source will be transmitted toward the surface of an object to be profiled along the optical axis and, due to reflection and/or scattering by the surface, light will be collected by the PSD 100 along an optical reception axis as depicted in FIGS. 2B and 3C. Each of the PSD comprises a pair of position sensitive photo-diodes the output of which is depicted in the uppermost view in each of the FIGS. 2C to 2E. The portion 112 of the uppermost view represents the portion of light spot incident on the proximal photo-diode of the PSD 110, while the right portion 114 depicts the portion of light incident on the distal photo-diode. When the optical output of the optical source impinges the surface in the proximity of a step, as shown in FIGS. 2D and 2E, some of the light to be collected by the photo-detector which is proximal to the edge will be blocked or partially blocked.

Figure 2C:
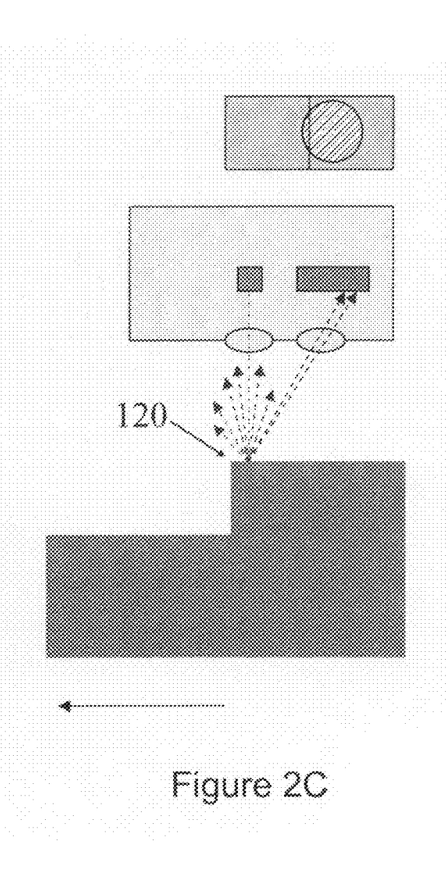
FIGS. 2C to 2E depict the relative outputs of the PSD of a conventional packaged optical displacement on scanning across a step along the direction indicated by the horizontal arrows and contrary to prescribed application conditions.
Figure 2D:
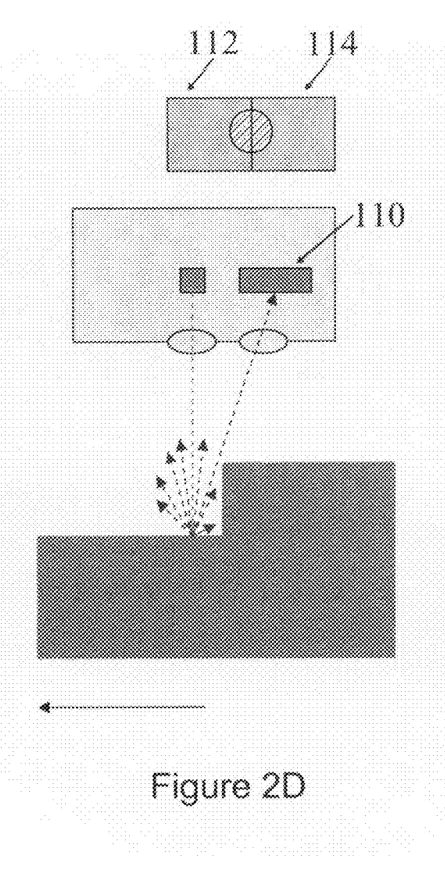
Figure 2E:
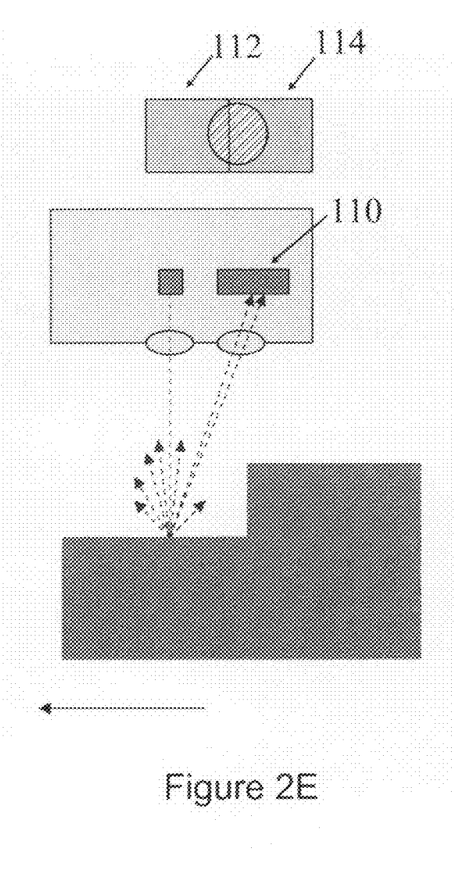

FIGS. 2C to 2E depict a series of the relative output of the photo-diodes of the PSD when the optical displacement sensor moves across a profiled surface from the right side of the page to the left side of the page. When the optical output axis is proximal to an edge 120 and approaches a falling edge, as shown in FIG. 2C, the photo-diode proximal to the optical source has a significantly lower output compared to that of the more distal photo-diode, in accordance with the geometry of disposition of the photo-diodes. The difference in output between the two photo-diodes will give the displacement information of the elevated surface by using the triangulation principle, as is well known to persons skilled in the art.

Figure 2F:
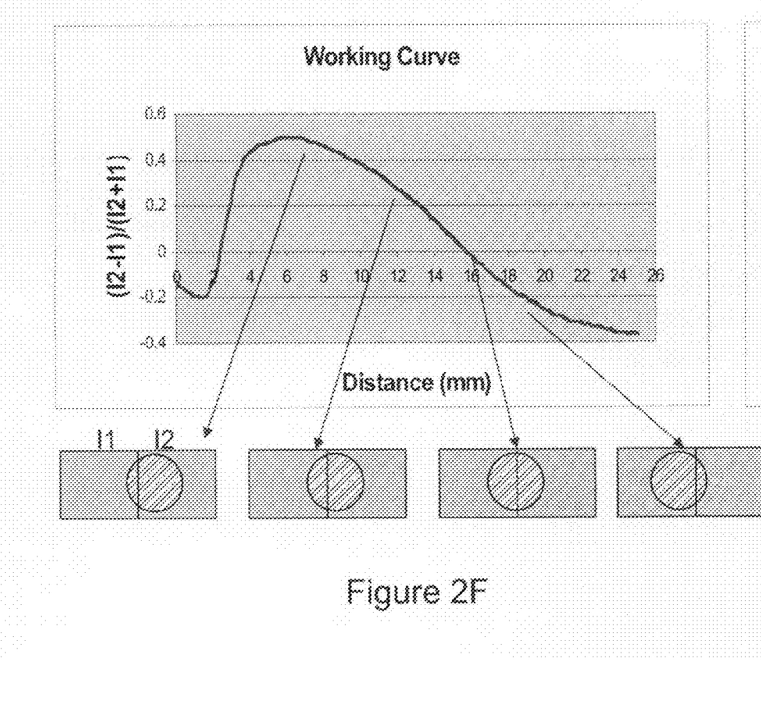
FIG. 2F is a representative curve illustrating relative outputs from a pair of photo-diodes of a PSD with reference to the displacement of the photo-diodes from a surface.
Figure 2G:
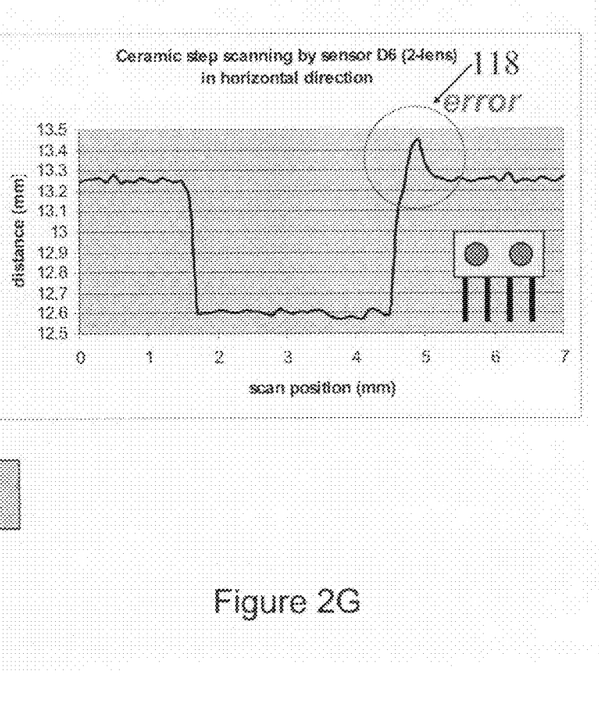
FIG. 2G illustrates a typical output of a convention optical displacement sensor when scanning across an uneven surface in an incorrect manner, resulting in edge detection error, FIG. 2H illustrate schematically a surface displacement sensor incorporating a conventional optical displacement sensor with exemplary algorithm for processing outputs from the two photo-diodes of an optical detector.
Figure 2H:
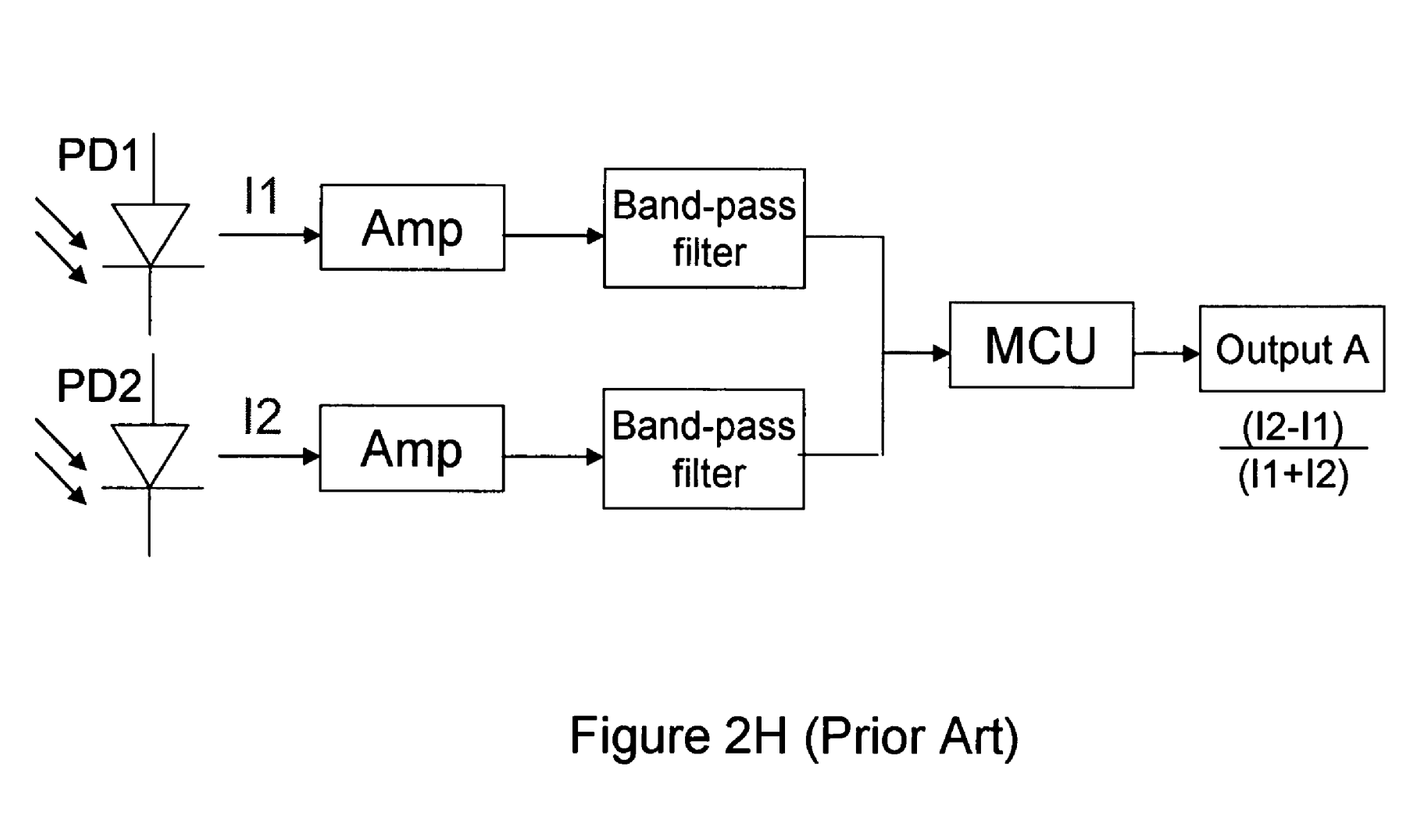

After the optical displacement sensor has moved to the depressed surface and clear of the influence of the step, the difference between the output of the proximal and distal photo-diodes will give the displacement information relating to the depressed surface. However, when in the situation of FIG. 2D or all, some of the light to be collected by the distal photo-diode will be blocked, resulting in a lesser output from the distal (or the right most) photo-diode, and a lower detection output usually signifies a longer reflection path. The reduction of optical output of the distal photo-diodes due to reduced illumination area will change the value of difference between the proximal and distal photo-diodes. As a result, the displacement information provided by the optical displacement sensor at the location depicted by FIG. 2D will be erroneous. An exemplary relationship between optical illumination on the proximal and distal photo-diodes as represented by their respective current outputs $I_1$ and $I_2$ are depicted in FIG. 2F and it will be appreciated that the difference in output of the proximal ($I_1$) and distal ($I_2$) photo-diodes could be correlated to identify the displacement as shown in the X-axis of FIG. 2F. An exemplary algorithm for obtaining the displacement depth relationship is depicted in FIG. 2H. As a result of blocking or partial blocking of light to be collected by an optical detector adjacent to a sharp edge, the loss in light detection in one of the position sensitive photo-diodes will result in an erroneous output of the different output, giving rise to an erroneous displacement information as shown in the circled portion 118 of an overshoot in FIG. 2G.

Figure 3:
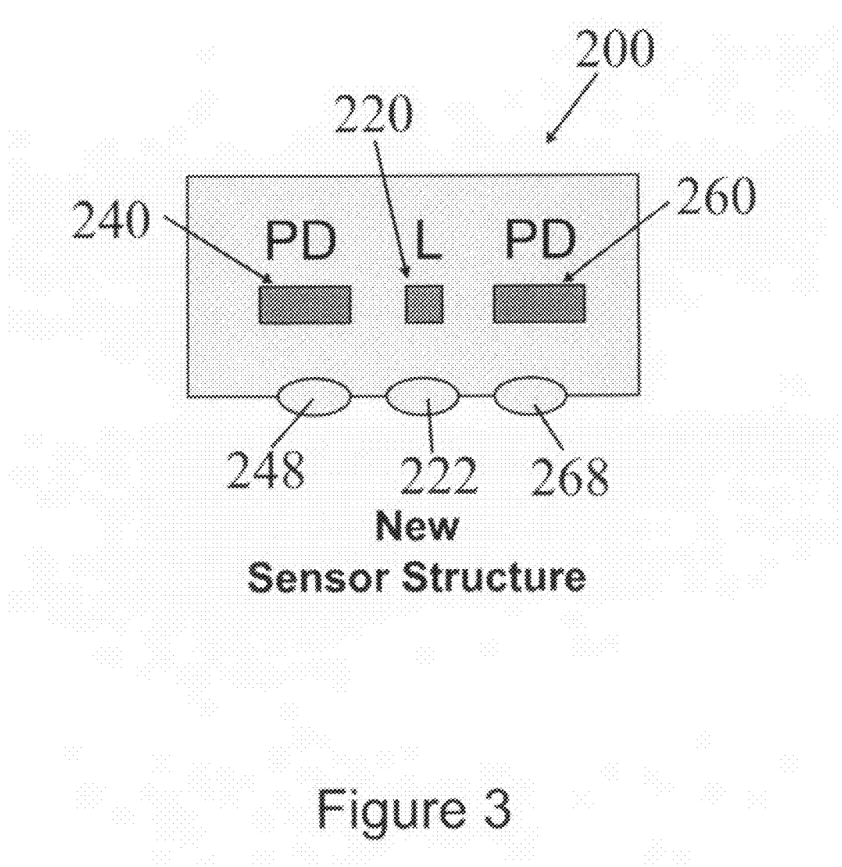
FIG. 3 depicts schematically a preferred embodiment of an optical displacement sensor of this invention.

An exemplary optical displacement sensor 200 of this invention is depicted in FIG. 3 which comprises an optical source 220 and a pair of optical detectors 240, 260 which are arranged such that the optical source 220 is intermediate or sandwiched between the pair of optical detectors. In addition, both optical detectors are arranged to collect light reflected and/or scattered from a surface due to, optical output from the optical source. The optical source 220 may be an LED source or a laser source with a characteristic optical output axis which defines the direction of light emission from the light optical source. Each of the optical detectors comprises a positioned sensitive photo-detector (PSD) each of which typically comprises at least a pair of photo-diodes which are arranged into a proximal photo-diode and a distal photo-diode with respect to the optical source. Each of the PSDs is characterized with an optical reception axis along which light scattered and/or reflected by a surface to be profiled to be collected by the PSD. When the optical displacement sensor is used in displacement measurement applications by surface profile scanning, the displacement sensor will move relative to the surface to be profiled along a scanning direction. The pair of optical detectors are arranged into a first optical detector 240 which is forward of the optical source and a second optical detector 260 which is rearward of the optical source. A collimating lens 222 is coupled to the optical source to define the optical output axis of the optical source. Likewise, a focusing lens 248, 268 is coupled to each of the optical detectors for a better definition of the optical reception axis. It will be noted that the optical output axis and the optical reception axis will define two long sides of a triangle for ascertaining the displacement of a surface relative to sensor using the triangulation principle. As such, the optical output axis and the optical reception axis of an imaginary optical detector will define an optical plane characteristic of a pair of optical source and each of the optical detectors.

As a preferred option, the components including the optical source, the pair of optical detectors and the lenses are all received within a housing in a module form. With the optical axes of the optical source and the optical detector are pre-aligned so that light reflected and/or scattered by a surface within range will be collected by both optical detectors under normal conditions. In a preferred arrangement, the PSDs 240, 260 are symmetric and are symmetrically disposed about the optical output axis.

An exemplary application of the optical displacement sensor of the embodiment of FIG. 3 will be described below with reference to FIGS. 3A to 3C in more detail with reference to an exemplary surface with a step as shown in the Figures.

Figure 3A:
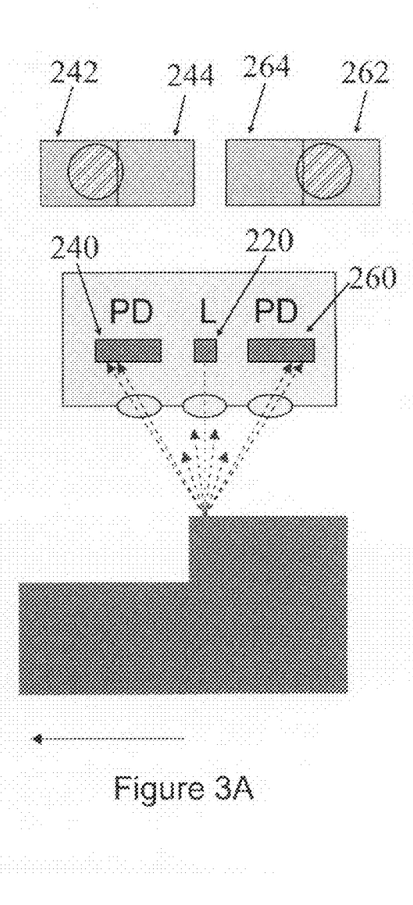
FIGS. 3A to 3C depict schematically the relative output of a pair of photo-diodes on each of the two PSDs of the optical displacement sensor of FIG. 3 when scanning a direction as indicated by the arrow underneath the main views.
Figure 3B:
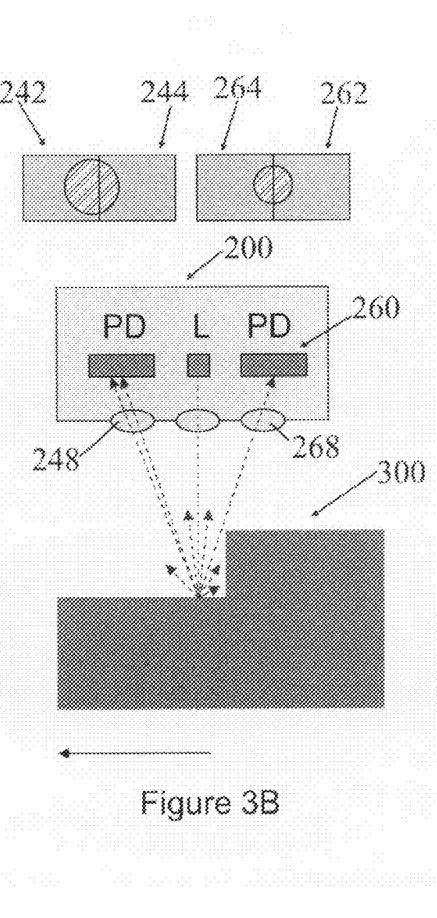
Figure 3C:
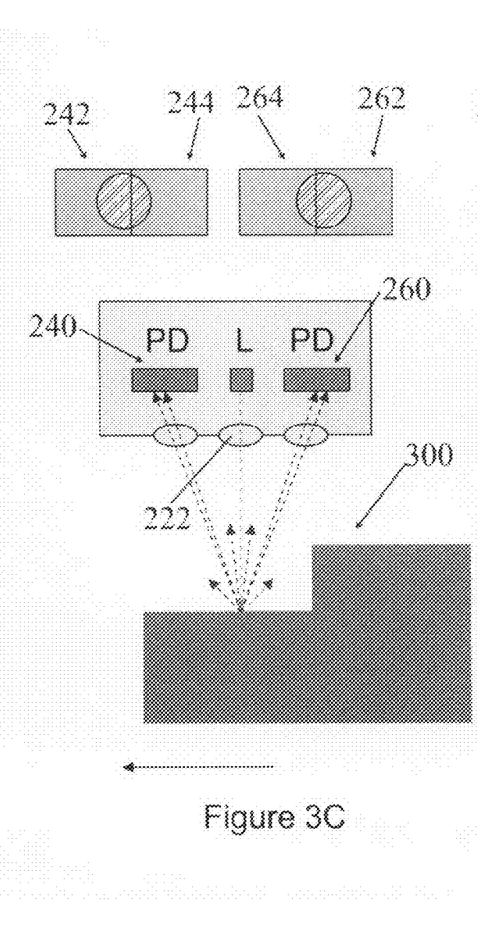
Figure 4A:
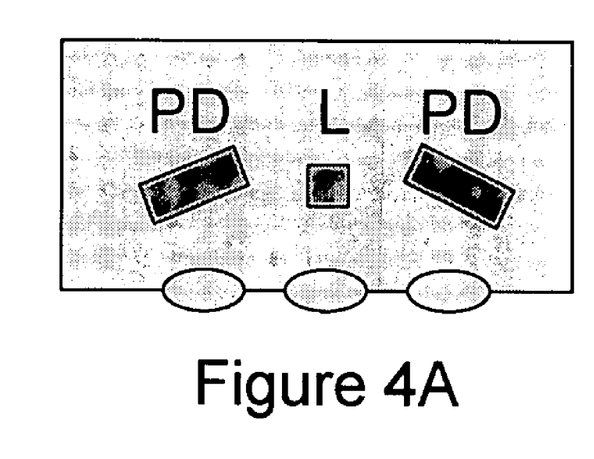
FIG. 4A depicts a first modified form of an optical displacement sensor of FIG. 3.
Figure 4B:
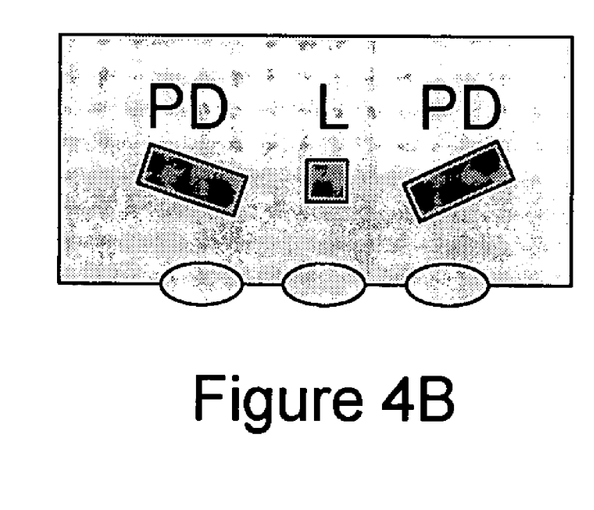
FIG. 4B illustrates a second modified form of an optical displacement sensor of FIG. 3.
Figure 4C:
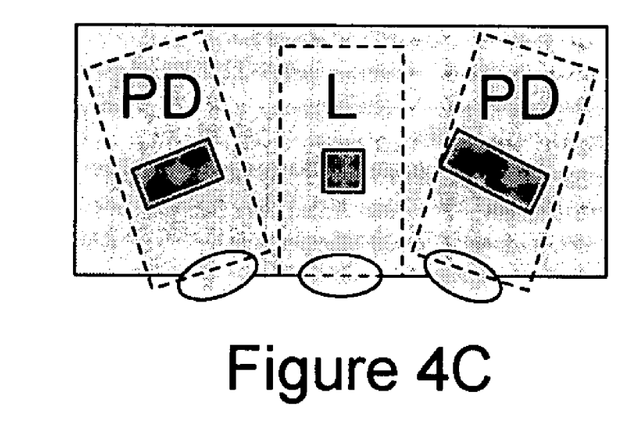
FIG. 4C illustrates a third modified form of an optical displacement sensor of FIG. 3.
Figure 4D:
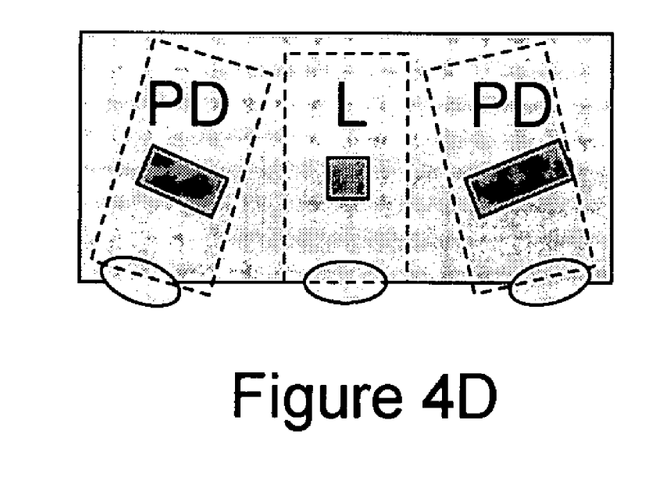
FIG. 4D illustrates a fourth modified form of an optical displacement sensor of FIG. 3.

Referring to FIG. 3A, there is shown a sensor 200 of the preferred embodiment of FIG. 3 above a surface to be profiled. Each of the PSD 240, 260 of an optical detector comprises a pair of photo-diodes the instantaneous light illumination area is depicted in the uppermost views in each of the Figures. More particularly, view portion 242 depicts the light detection pattern of a distal photo-diode of the first PSD 240, view portions 244, 264 depict the light detection pattern of the proximal photo-diodes of the first and second PSDs respectively, and view portion 262 depicts the light detection pattern of the distal photo-diode of the second PSD 260.

As shown in FIG. 3A, the optical source is configured to emit light towards an object along an optical output axis which is substantially orthogonal to the surface 300 being profiled. When the optical output of the optical source encounters the surface being monitored, light will be returned towards the sensor 200 by, for example, scattering and/or reflection. Each PSD of the sensor is arranged to collect light returning from optical reception axis through the focusing lens 248, 268. The pair of optical reception axes of the first (forward) 242 and the second (rearward) 268 PSDs together defines a triangular outline, with the optical output axis and the optical reception axes meeting at the vertex of the triangle. In addition, the optical output axis is intermediate the pair of optical reception axes. Furthermore, since light emitted by the optical source is scattered upon encountering the surface to be scanned, the entirety of the scattered light has a conical distribution, with the optical output axis and the pair of optical reception axes merging at the vertex of the cone. When the optical output of the optical source impinges on the surface to be profiled and with the conical distribution of the returned light clear of an edge, the optical detection characteristics of the two PSDs are depicted in more details as shown in FIGS. 3A and 3C. The uppermost views of FIGS. 3A to 3C represent the distribution of illuminated areas on the pair of photo-diodes on each of the PSDs. In this exemplary embodiment, the PSDs are symmetrical and disposed symmetrically on either sides of the optical output axis. Therefore, the total area of illumination on (or the total incident light energy detected by) each of the PSDs due to light collected along each of the respective optical reception axes would be equal and are represented by circles of equal dimension as shown in the uppermost views.

Each of the PSD comprises a distal photo-diode and a proximal photo-diode. Due to a skewed incidence of the incident beam on a PSD, the distal photo-diode of a PSD will have a larger area of illumination while the proximal photo-diode will have a smaller area of illumination. By correlating the difference between the areas of illumination on the proximal and distal photo-diodes, for example, using the triangulation method, the displacement between the sensor and the surface being profiled could be evaluated. For example, the displacements can be evaluated with reference to the characteristic curves similar to that of FIG. 2F. When the optical sensor is moved so that the optical source is directly above the elevated surface, the difference in the illuminated area on each pair of the proximal and distal photo-diodes will be more noticeable due to the increasing skewing of the incident beams being collected by the PSD. Likewise, the displacement of the elevated surface relative to the depressed surface can be evaluated with reference to a calibration curve similar to that of FIG. 2F. However, when the optical source is directly above a depressed surface and proximal to an edge, light returning from the surface towards the second optical detector, which is proximal to the step, will be blocked or partially blocked, thereby resulting in reduced area of illumination in the second PSD as well as distorting the distribution of illuminated area on the two photo-diodes of the PSD. As a result, an erroneous displacement information will be output by the PSD. It will be appreciated the situation of FIG. 3B is intermediate stable conditions of FIG. 3A and FIG. 3C and the error due to partial blocking or blocking of light to be collected by the distal photo-diode will be quite noticeable since such a blocking or partial blocking lead to distortion of differences between the output of the two photo-diodes and the resulting displacement information will appear as a overshoot similar to that of the circled portion of FIG. 2G. An exemplary displacement sensor utilizing a conventional optical displacement sensor of FIG. 2 is shown in FIG. 2H.

In this invention, the pair of PSDs and the optical source is arranged with a pre-determined geometric relationship such that both PSDs are arranged to detect light scattered and/or reflected by a surface on which light from the optical source is incident. Because of the pre-determined geometric relationship between the pair of PSDs and the optical source, any abnormal loss of optical detection by any one of the PSDs due to edge blocking will be recognizable and detectable by geometrically correlating the light intensity received by each of the PSDs under normal circumstances. In a preferred example in which the optical displacement sensor comprises a pair of symmetrical PSDs which are symmetrically disposed on both sides of the optical output axis, the light energy detected by the pair of PSDs should be identical due to the symmetrical arrangement of the pair of PSDs and since both PSDs are aligned to collect light reflected and/or scattered by the same surface. When an optical displacement sensor with a pair of symmetrical PSDs disposed symmetrically about the optical axes, and noting that the optical detection by each of the PSDs should be identical under normal conditions due to optical symmetry, it will be appreciated that any abnormalities would be due to blocking or partial blocking by a step. Therefore, a possible remedy to mitigate adverse influence due to blocking or partial blocking of the optical collection path will be to select the output of a PSD with a higher optical detection, since a reduction in optical detection is very likely due to blocking and/or partial blocking of the optical collection path.

FIGS. 4A to 4D illustrate variation of optical displacement sensors of this invention with symmetrical disposition of the PSDs with respect to an optical source and with various geometric dispositions of the PSDs for various applications.

Figure 5:
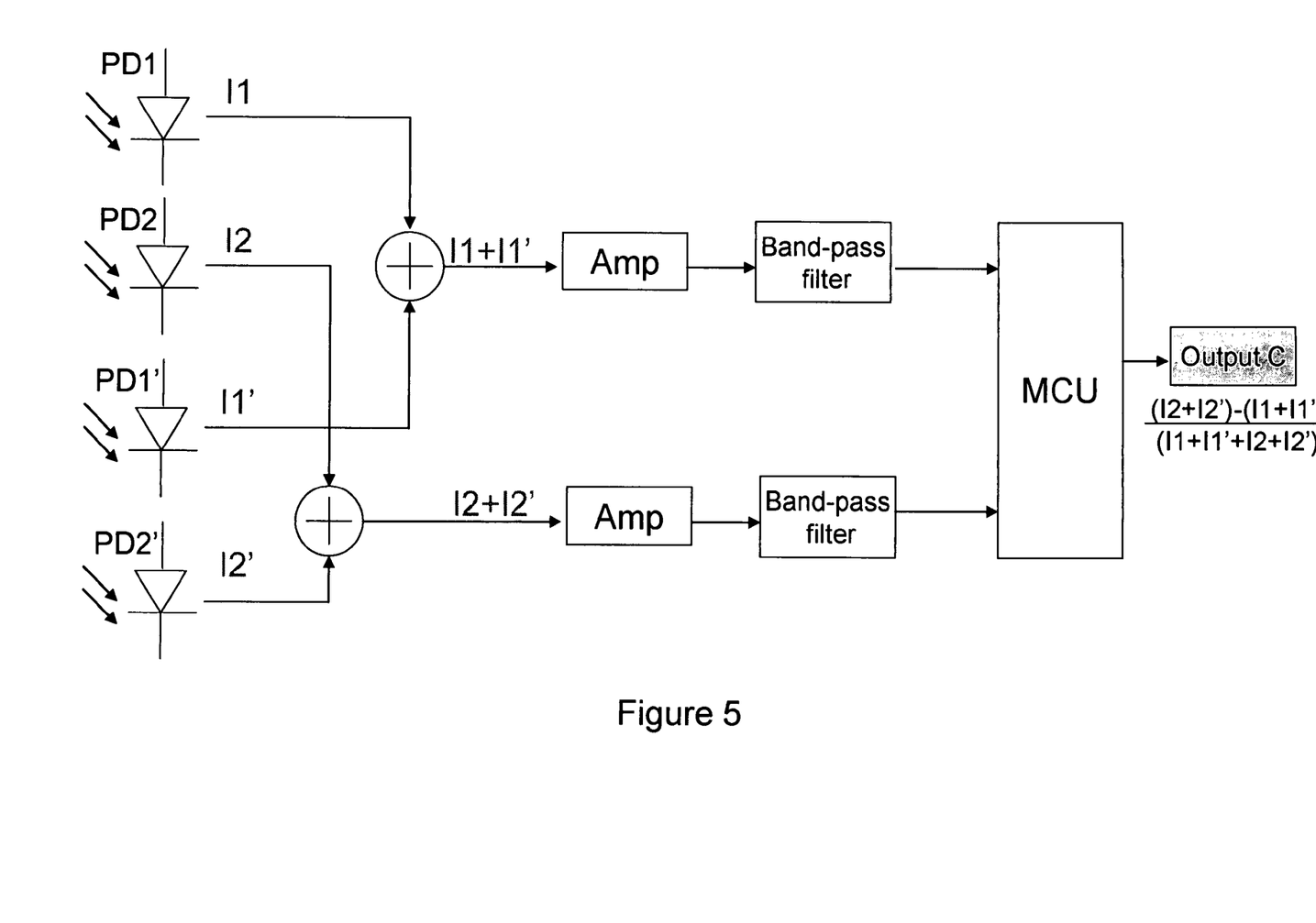
FIG. 5 illustrates a first exemplary surface displacement sensor comprising a surface displacement sensor of FIG. 3.
Figure 7:
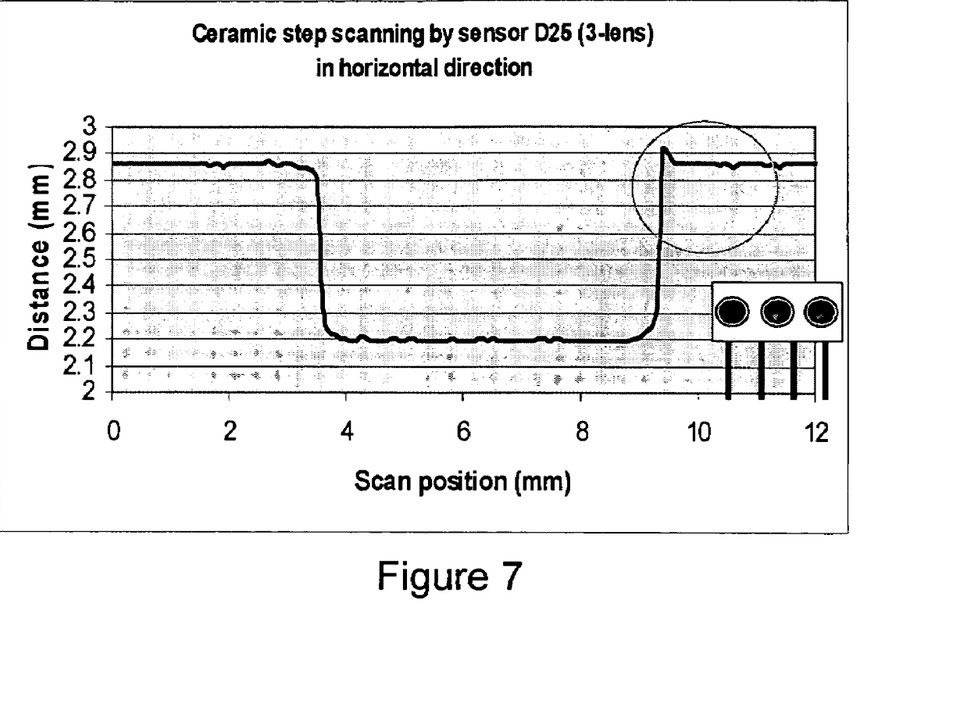
FIG. 7 illustrates an exemplary output curve of the surface displacement sensor using the algorithm of FIG. 5.

An exemplary surface displacement sensor comprising a signal processing circuitry including an optical displacement sensor of this invention and a processor is illustrated in FIG. 5. Referring to FIG. 5, the output of the distal photo-diodes, namely, $I_2$ and $I_2'$, and the output of the proximal photo-diodes, namely, $I_1$ and $I_1'$, is grouped respectively for processing by a processor which is a MCU (microcontroller unit) in this example. By adding the output of the proximal photo-diodes, that is, $I_1+I_1'$, which are then to be subtracted from the added effect of the distal photo-diodes, namely, $I_2+I_2'$, an averaged difference between the pair of proximal and distal photo-diodes can be obtained, similar to the calculation depicted in FIG. 2F above. Consequently, the effect of partial blocking or blocking can be averaged out as shown in FIG. 7, with reduced overshoot in the circled portion.

Figure 6:
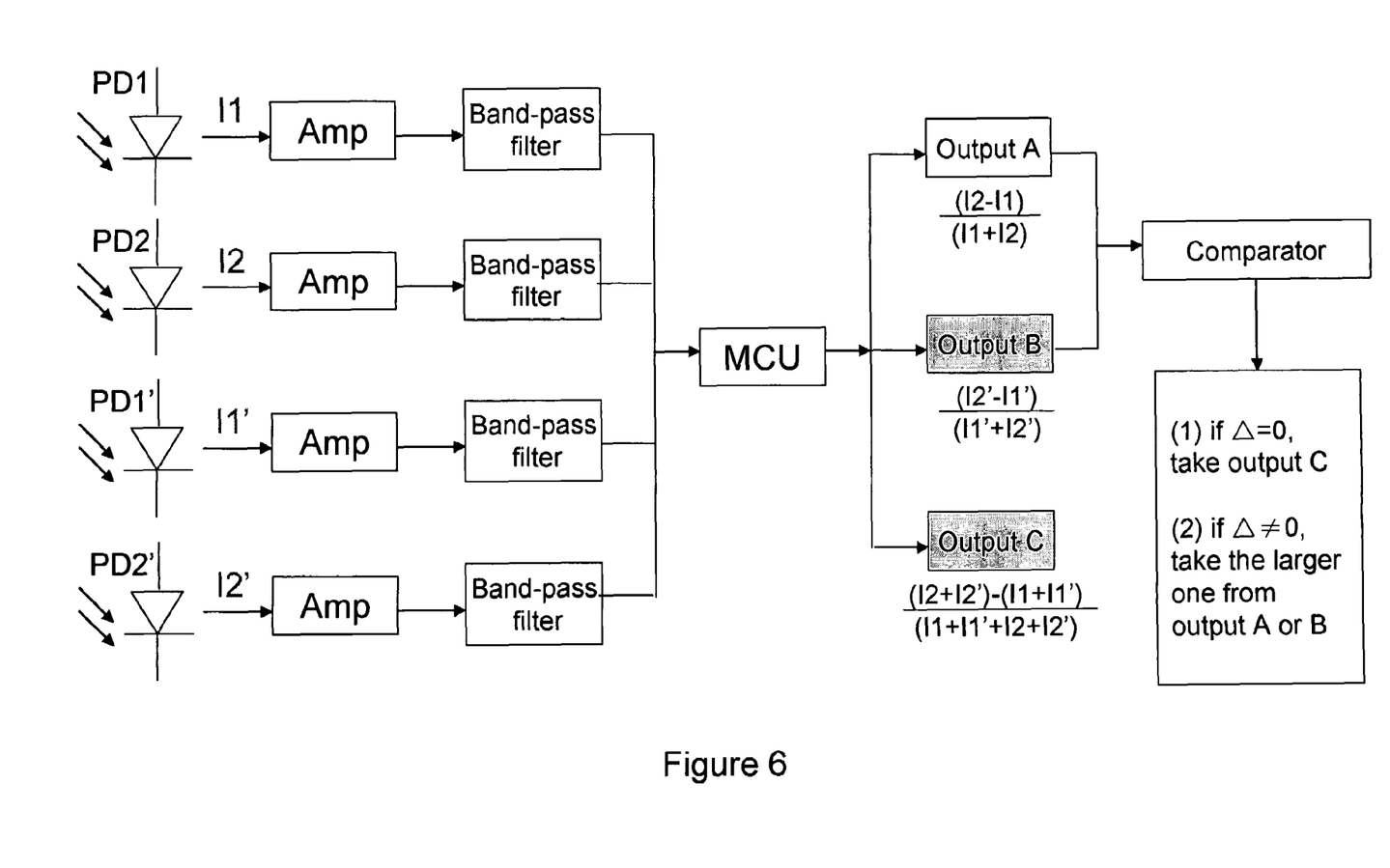
FIG. 6 shows in schematics a second exemplary surface displacement sensor incorporating an optical displacement sensor of this invention.
Figure 8:
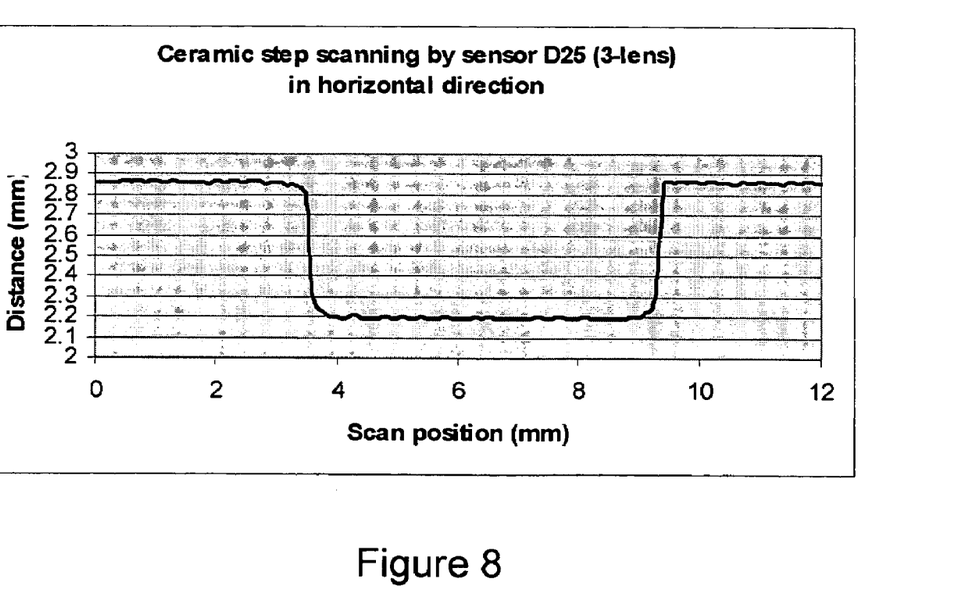
FIG. 8 illustrates the exemplary output curve of a surface displacement sensor using the algorithm of FIG. 6.

In another surface displacement sensor arranged as depicted in FIG. 6, the outputs of the individual photo-diodes of the PSDs are forwarded to a MCU for further processing. In this arrangement, the outputs of the photo-diodes of the PSDs are individually processed and stored. Three exemplary outputs are available at the MCU output, namely, output A, output B and output C, as depicted more particularly in FIG. 6. Output A represents the difference between the output ($I_2$) of the distal photo-diode of the first PSD and the output, ($I_1$) of the proximal photo-diode of the first PSDs. Output B represents an output difference between the output $I_2$ prime of the distal photo-diode of the second PSD and the output ($I_1'$) of the proximal photo-diode of the second PSD. Output C is the average output of the algorithm of FIG. 5. Outputs A and B are connected to a comparator so that if there are no differences between outputs A and B, there is no apparent adverse influence due to step blocking, and the average output of C will be taken as an output for displacements evaluation. On the other hand, if there exists difference between outputs A and B, there is a clear suggestion of adverse influence due to step blocking in which case only the output from a PSD with a higher optical detection output will be selected for evaluation of displacement information to mitigate adverse influence due to edge blocking. By selectively processing data in the afore-mentioned manner, the uncontaminated or un-distorted, are processed to obtain the depth-displacement relationship and a clean result as shown in FIG. 8 could be obtained.

Although symmetrical PSDs which are symmetrically disposed about the optical output axis have been described above, it would be appreciated that as long as there are pre-determined geometric relationship between the optical source and the PSDs such that the optical detection characteristics can be characterized and/or calibrated, the PSDs need not be symmetrical nor symmetrically disposed.

While the present invention has been explained by reference to the preferred embodiments described above, it will be appreciated that the embodiments are only illustrated as examples to assist understanding of the present invention and are not meant to be restrictive on its scope. More particularly, variations or modifications which are obvious or trivial to persons skilled in the art, as well as improvements made on the basis of the present invention, should be considered as equivalence to the present invention.

Furthermore, while the present invention has been explained by reference to optical assemblies comprising LEDs, it should be appreciated that the invention can apply, whether with or without modifications, to other semiconductor light-emitting sources without loss of generality.

The invention claimed is:

1. An optical displacement sensor for measuring distance or surface displacement of an object by surface profile scanning comprising:
    an optical source, a first optical detector, a second optical detector, a first focusing lens and a second focusing lens,
    said optical source being located intermediate said first and said second optical detectors, said first optical detector being forward of said optical source and said second optical detector being rearward of said optical source, and
    said first focusing lens and first optical detector being arranged to collect light coming from said object along a first direction, and said second focusing lens and second optical detector being arranged to collect light coming from said object along a second direction, said first and second directions being divergent from said object, and said first and second focusing lens and first and second optical detectors being arranged to collect light emitted by said optical source when scattered by and reflected from surface of said object;
    wherein said first and second focusing lens and first and second detectors are arranged so that when said optical source emits light towards a depressed surface proximal a step, only light reflected or scattered from said depressed surface and to be collected by one of said optical detectors will be blocked or partially blocked by said step; and
    wherein said first and second detectors are arranged such that relative movements between said optical source and said object along a scanning direction will output information corresponding to the profile of said surface of said object.

2. The optical displacement sensor according to claim 1, wherein said optical source is configured to emit light along an optical output axis, and said first and second directions are divergent from said optical axis.

3. The optical displacement sensor according to claim 1, wherein said optical source is configured to emit light along an optical output axis, said first optical detector is configured to detect light coming along a first optical reception axis, said second optical detector is configured to detect light coming along a second optical reception axis, said optical output axis is intermediate said first and second optical detection axes, said first and second optical detection axes define there-between an optical detection region, and said step is an optical barrier situated within said optical detection region.

4. The optical displacement sensor according to claim 3, wherein said optical detection region defines the minimum transversal resolution of said displacement sensor, and said minimum transversal resolution defines the minimum transversal separation between an adjacent pair of steps the displacement between which can be measured by said sensor.

5. The optical displacement sensor according to claim 4, wherein said minimum transversal separation defines the minimum clearance between an oppositely adjacent pair of steps above which only light to be collected by either one, but not both, of said optical detectors will be blocked or partially blocked by a step.

6. The optical displacement sensor according to claim 3, wherein said first optical reception axis and said second optical axes together define an axial cross-sectional outline of a cone, with said first and second optical reception axes and said optical output axis meeting at the vertex of said cone.

7. The optical displacement sensor according to claim 6, wherein said cone defines the minimum separation between said optical output axis and the edge of a step below which light to be collected by an optical detector proximal to said step will be blocked or partially blocked.

8. The optical displacement sensor according to claim 7, wherein said first and second planes encounter said step at an angle.

9. The optical displacement sensor according to claim 8, wherein said optical detectors are equidistant from said optical source.

10. The optical displacement sensor according to claim 8, wherein said optical detectors and said optical source are accommodated within a housing, and said optical detectors and said optical source are optically communicable with said surface being profiled respectively through said focusing lenses and said collimating lens.

11. The optical displacement sensor according to claim 7, wherein said first and second planes encounter said step orthogonally.

12. The optical displacement sensor according to claim 3, wherein each one of said optical detectors comprises a position sensitive photo-detector, and each one of said first and second optical reception axes and said optical output axis defines two long sides of a triangle for determining the vertical displacement of a surface by the triangulation principle with reference to the output of said position sensitive photo-detector.

13. The optical displacement sensor according to claim 1, wherein said optical source is configured to emit light along an optical output axis, said first and second optical detectors are configured to detect light coming along a first optical reception axis and a second optical reception axis respectively, said first optical reception axis and said optical output axis define a first plane, said second optical reception axis and said optical output axis define a second plane, and said sensor is configured so that upon relative movements between said sensor and said object along a scanning direction for measuring the surface profile of an object, said first and said second planes will encounter said step sequentially and output profile information concerning said step at different times.

14. The optical displacement sensor according to claim 1, wherein said optical source is configured to emit light along an optical output axis, said first and second optical detectors are configured to detect light coming along a first optical reception axis and a second optical reception axis respectively, said first optical reception axis and said optical output axis define a first plane, said second optical reception axis and said optical output axis define a second plane, and said sensor is configured so that upon relative movements between said sensor and said object along a scanning direction for measuring the surface profile of an object, said first and said second planes will encounter said step orthogonally.

15. The optical displacement sensor according to claim 1, wherein said optical source is coupled with a collimating lens to output light towards said object along an optical output axis, and each one of said optical detectors is coupled to a focusing lens for collecting light reflected and/or scattered by said surface being profiled during operation.

16. The optical displacement sensor according to claim 15, wherein each said optical detector is arranged to detect the spot location of an incident optical beam.

17. The surface displacement sensor according to claim 16, wherein said optical source is configured to emit light towards an object the surface profile of which is to be scanned, said first optical detector is forward of said optical source, and said optical detector is rearward of said optical source.

18. The surface displacement sensor according to claim 16, wherein each one of said optical detectors comprises a position sensitive optical detector, and said position sensitive optical detector is characterised in having an output which is dependent on the position of incidence of an optical signal.

19. The surface displacement sensor according to claim 18, wherein said first optical detector is forward of said optical source, said optical detector is rearward of said optical source, the output of the leading optical detector which is said first optical detector is selected for processing by said processor to produce displacement information on the step height of said step after said first optical detector has passed said step.

20. The surface displacement sensor according to claim 16, wherein said position sensitive optical detector comprises at least one pair of photo-detectors, and said processor is configured to process the difference in output between said pair of photo-detectors to compile surface profile information of an object.

21. The surface displacement sensor according to claim 16, further comprising a movement mechanism to cause relative movement between said optical displacement sensor and said surface of said object along a direction which is substantially orthogonal to a step, and said processor is configured to select an output from the outputs of said first and second detectors upon encountering said edge.

22. The surface displacement sensor according to claim 16 for IC surface profiling applications.

23. The optical displacement sensor according to claim 15, wherein each said optical detector comprises at least two photo-diodes.

24. The surface displacement sensor according to claim 23, wherein said first optical detector is arranged to collect light coming from said object along a first direction, and said second optical detector is arranged to collect light coming from said object along a second direction, said first and second directions being divergent from said object.

25. The optical displacement sensor according to claim 1, wherein each said optical detector comprises a position sensitive optical detector, and said position sensitive optical detector is characterised in having an output which is dependent on the position of incidence of an optical signal.

26. The optical displacement sensor according to claim 1, wherein said optical source comprises an LED.

27. The surface displacement sensor according to claim 26, wherein said optical source is configured to emit light along an optical output axis, and said first and second directions are divergent from said optical axis.

28. The surface displacement sensor for measuring displacement by scan profiling of the surface of an object, said displacement sensor comprising an optical displacement sensor of claim 1 and a processor, wherein said processor is configured to process outputs of said optical detectors to compile surface profile information of an object.

29. The surface displacement sensor according to claim 28, wherein said surface profile information is compiled from output of said position sensitive optical detector.

* * * * *